United States Patent [19]
Carter et al.

[11] 4,301,501
[45] Nov. 17, 1981

[54] CAPACITOR RATIO MULTIPLIER

[75] Inventors: Larry E. Carter, Westminster; Robert M. Ashby, Pasadena, both of Calif.

[73] Assignee: American Telecommunications Corporation, El Monte, Calif.

[21] Appl. No.: 146,058

[22] Filed: May 2, 1980

[51] Int. Cl.³ .............................................. H02M 3/06
[52] U.S. Cl. .............................................. 363/62; 320/1
[58] Field of Search ................ 307/110; 320/1; 323/233, 352; 363/59–62

[56] References Cited
U.S. PATENT DOCUMENTS 3,478,258  11/1969  Tamninagai .................... 363/62
4,186,436   1/1980  Ishiwatari ...................... 363/60

FOREIGN PATENT DOCUMENTS 40-12179  4/1965  Japan ............................ 363/62

*Primary Examiner*—William M. Shoop
*Attorney, Agent, or Firm*—Christie, Parker & Hale

[57] ABSTRACT

A capacitor ratio multiplier has a switched capacitor for switching between sampling, sharing and delivering charge modes. During the sampling mode, the switched capacitor receives charge from a port in a circuit. During th sharing mode, the switched capacitor is paralleled by a sharing capacitor and is partially discharged thereby. The switched capacitor is connected to a port in the circuit for delivering charge. The sharing capacitor is discharged prior to sharing charge with the switched capacitor.

11 Claims, 7 Drawing Figures

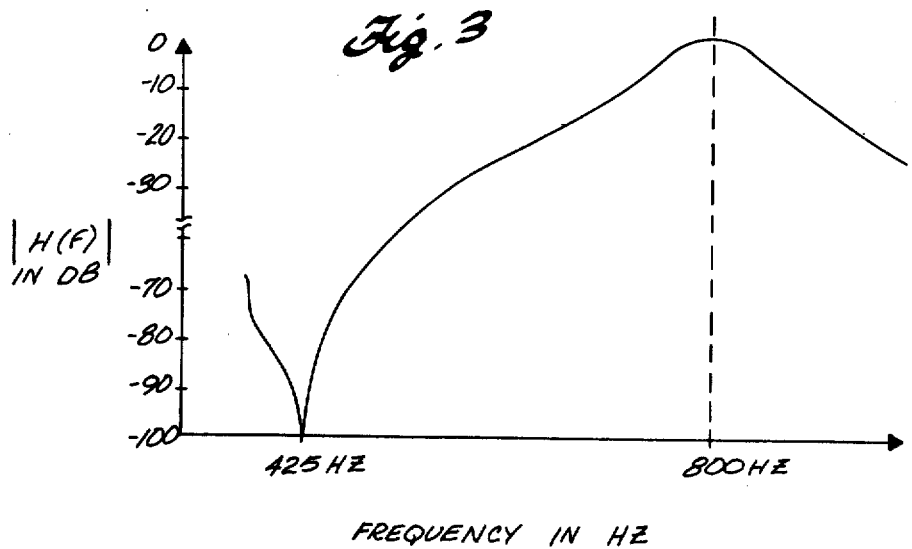
Fig. 3
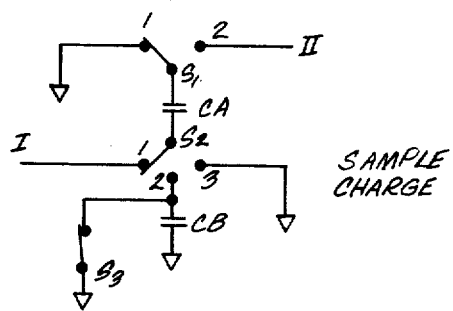
Fig. 4A SAMPLE CHARGE
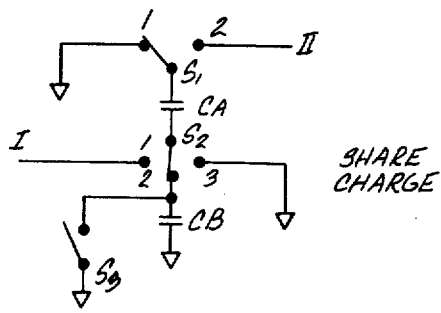
Fig. 4B SHARE CHARGE
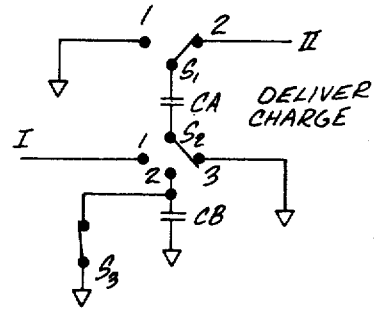
Fig. 4C DELIVER CHARGE

CAPACITOR RATIO MULTIPLIER

CROSS-REFERENCE TO RELATED APPLICATION

U.S. application Ser. No. 146,061 titled ADAPTIVE FILTER, filed on even date herewith in the names of Larry E. Carter and Ronald R. Lien discloses common subject matter with this application and is incorporated in its entirety by reference.

BACKGROUND OF THE INVENTION

Semiconductor technology has recently included frequency and phase control circuits which depend on the ratio of pairs of capacitors and which provide superior accuracy compared to earlier technology. One of the main limitations of this new technology is the range of capacitor ratios available on the semiconductor chip for a given area. This invention relates to a capacitor ratio multiplier which increases the range of accurate capacitor ratios available for a given chip area thus increasing the range of frequency and gain of filters and phase controls for a given cost.

A common application for a capacitor ratio multiplication is in a filter circuit formed on a monolithic microelectronic chip. Prior attempts to form capacitors having very small capacitance values on monolithic microelectronic chips have been fairly unsuccessful due to the inability to accurately provide the small chip areas required to produce such small capacitance values. Contemporary chip manufacturing technology has not been able to produce and accurately measure such small chip areas. Additionally, parasitic capacitances in the vicinity of the small capacitors influence the capacity values of such capacitors beyond the amount tolerable in a designed circuit.

There are several circuit techniques available that can be utilized for reducing the effective capacitance value of a capacitor. For example, a number of series-connected capacitors may be used in replacement of a single small value capacitor. This technique, however, requires the use of larger chip areas due to the areas required for each individual series-connected capacitor.

Circuits that include switched capacitors have transfer functions that depend on the switched capacitor capacitance value and the capacitor switching frequency. The range of capacitance values available in such circuits therefore depends heavily on the permissible variation in the switching frequency. Such circuits have a narrow range of equivalent capacitance values that the switched capacitors can provide. Attempts to increase and provide additional range of parameter values than practically available have fallen short of their design goals.

One application of switched capacitors is in the simulation of "resistors" in conjunction with other capacitors and amplifiers for providing active RC filters. The design of these filters is considerably dependent upon the range of "resistance" values obtainable by switched capacitor techniques. Attempts to increase the range of equivalent resistance values that a switched capacitor can simulate have not, however, proven very successful.

SUMMARY OF THE INVENTION

According to the invention, a switched capacitor is switched between charge sampling, sharing and delivering modes. During the sampling mode, the switched capacitor receives charge from a circuit port to which it is connected. During the sharing mode, a sharing capacitor is paralleled with the switched capacitor. The switched capacitor is partially discharged by sharing charge with the capacitor, the amount of charge remaining on the switched capacitor being in relation to their respective capacitances.

Subsequent to charge sharing, the switched capacitor is connected to a different circuit port for delivering charge. During charge delivery, the sharing capacitor is discharged. The foregoing method is repetitively repeated in the order described.

A feature of the invention is that the partial discharging of the switched capacitor causes an equivalent reduction in the capacitance of the switched capacitor. A lower limit on the size to which capacitances can be fabricated especially on monolithic chips is determined by parasitic capacitances existing on the chip and the accuracy to which chip areas that define such capacitors are measurable. Significantly, the charge-sharing method permits equivalent capacitance reductions without encountering the problems associated with small capacitor chip areas.

Another feature of the invention is the provision of cascaded capacitor ratio multiplier circuits to form equivalent capacitance reductions that are the products of each capacitance ratio multiplication.

Another feature of the invention is the provision of greater range of resistance values simulated by the switched capacitor.

Another important feature of the invention is the reduction of micro-electronic chip area over conventional devices for the realization of equivalent capacitance values.

BRIEF DESCRIPTION OF THE DRAWINGS

FIG. 3 is a graph of a filter attenuation characteristic vs frequency.

FIGS. 4A-4C show a switched capacitor in each of three circuit connections for capacitance ratio multiplication.

DETAILED DESCRIPTION

The discussion of the co-pending application cited in the cross-reference to related application is hereby incorporated by reference.

Figure 1:
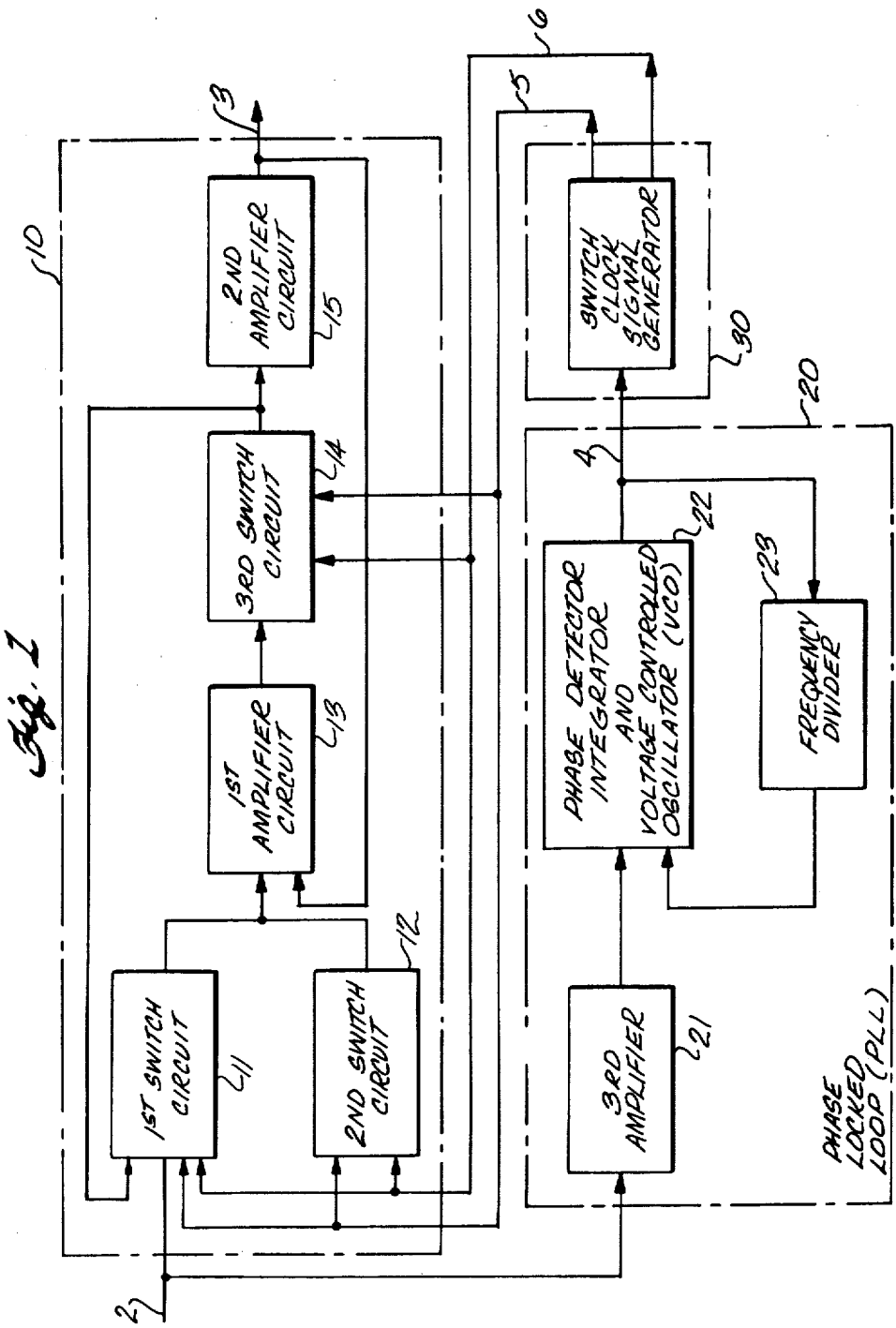
FIG. 1 is a block diagram of an adaptive filter for selectively filtering signals having specific frequency components contained within a spectrum of signals.

FIG. 1 is a block diagram depicting the general organization of a preferred embodiment of a capacitor ratio multiplier adapted for use in an adaptive filter circuit. The adaptive filter includes a controllable filter 10, a phase-locked loop (PLL) 20 and a switch clock signal generator 30. The adaptive filter has an input 2 and an output 3. The PLL 20 is coupled to input 2 and includes a frequency divider 23 connected in a feedback arrangement with the PLL. The PLL provides an output having a frequency which is a function of the frequency of the input 2 to which the PLL is locked and the amount of frequency division provided by divider 23. The PLL has an output 4 that is coupled to a switch clock signal generator 30.

The generator 30 has outputs 5 and 6 designated as $\phi 1$ and $\phi 2$ respectively, each signal being preferably in the form of digital pulse trains. The output appearing at 5 is phased approximately 180° from the pulse train appearing at output 6. The pulse trains have duty cycles, preferably slightly less than 50%, and form non-overlapping switch clock signals for switching switched capacitors (to be explained later) in the controllable filter 10. The pulse rate of the signals appearing at outputs 5 and 6 vary in accordance with the frequency of the signal appearing at the output 4 of the PLL. The outputs 5 and 6, as previously described, control the switching rates of the switched capacitors in the controllable filter. The controllable filter 10 includes a first switch circuit 11 and a second switch circuit 12. The first and second switch circuits are coupled to the input of a first amplifier circuit 13. The first switch circuit 11 is also coupled to the input 2 of the controllable filter. The output of the first amplifier circuit is coupled to the input of a third switch circuit 14. The output of the third switch circuit is coupled to the input of the second amplifier circuit 15. The second amplifier circuit is coupled to the output 3 of the controllable filter 10. The two-phase outputs of the generator 30 are coupled to the first, second and third switch circuits.

As previously mentioned, the controllable filter includes switched capacitors whereby the frequency of switching the switched capacitors determines in part the characteristics, i.e., transfer function, of the filter. The first, second and third switch circuits include the switched capacitors and associated "switches" and are shown in greater detail in FIG. 2.

Figure 2:
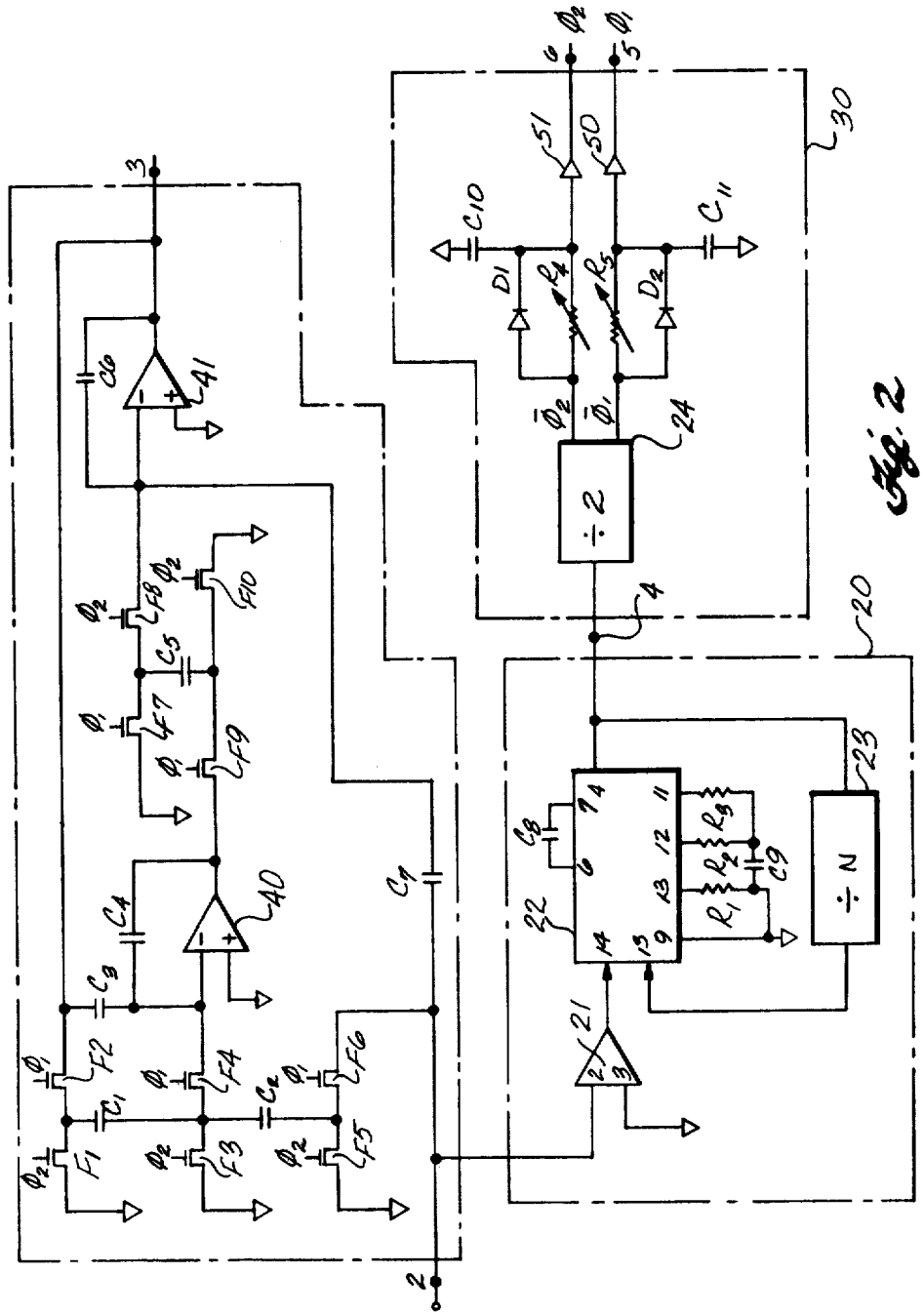
FIG. 2 is a detailed circuit schematic of the filter of FIG. 1.

As shown in FIG. 2, the controllable filter 10 consists of an array of switched capacitors, i.e., C1, C2 and C5, fixed capacitors C3, C4, C6 and C7 and high-gain differential amplifiers 40 and 41. Switched capacitor C1 is coupled, at one terminal, to the junction of field effect transistors (FET) F1 and F2, and, at the other terminal, to the junction of FETS F3 and F4. Switched capacitor C2 is connected, at one terminal, to the junction of FETS F3 and F4 and at the other terminal, to the junction of FETS F5 and F6. FET F1 is coupled between capacitor C1 and ground, FET F2 is coupled between capacitor C1 and the output 3 of the controllable filter. FET F3 is coupled between the junction of capacitors C1 and C2 and ground, and FET F4 is coupled between the junction of capacitors C1 and C2 and the inverting input of operational amplifier 40. FET F5 is coupled between capacitor C2 and ground and FET F6 is coupled between capacitor C2 and the input 2 of the controllable filter. Capacitor C3 is connected between the output 3 of the filter and the inverting input of amplifier 40. Capacitor C4 is connected in a feedback arrangement between the output and the inverting input of amplifier 40.

FET F7 is connected between capacitor C5 and ground, and FET F8 is connected between capacitor C5 and the inverting input of amplifier 41. FET F9 is coupled between capacitor C5 and the output of amplifier 40, and FET F10 is connected between capacitor C5 and ground. Capacitor C7 is connected between the input 2 and the inverting input of amplifier 41. Capacitor C6 is connected across the output and inverting input of amplifier 41. The non-inverting inputs to amplifiers 40 and 41 are connected to ground. The gates of FETS F1, F3, F5, F8 and F10 are connected to switch clock signal $\phi 2$ and the gates of FETS F2, F4, F6, F7 and F9 are connected to switch clock signal $\phi 1$. The first switch circuit includes switched capacitor C1 and FETS F1, F2, F3 and F4. The second switch circuit includes switched capacitor C2 and FETS F5 and F6, and the third switch circuit includes switched capacitor C5 and FETS F7, F8, F9 and F10.

Phase-locked loop (PLL) 20 consists of a signal conditioning amplifier 21; a phase detector, integrator and voltage controlled oscillator (VCO) all in a single unit 22; and a frequency divider network 23.

The phase detector, integrator and VCO 22 may be a commercially available cmos chip, such as a 4046 manufactured by any of several commercial micro-electronic chip manufacturers. (Note that the numbers placed internal to unit 22 refer to the conventional pinout numbers used by manufacturers of the 4046 chip).

The frequency divider 23 may be formed by a single or a number of serially connected divider networks. By way of example, for a division of 200, two divide by 10 and one divide by 2 chips, such as commercially available cmos chips 4017 and 4013 respectively, may be used.

The switch clock signal generator 30 includes a divide by 2 network 24 having complementary outputs $\overline{\phi_2}$ and $\overline{\phi_1}$ in the form of respective pulse trains. The outputs $\overline{\phi_2}$ and $\overline{\phi_1}$ are each coupled to separate lag circuits for producing two-phase non-overlapping clock signals. More specifically, the output $\overline{\phi_1}$ of network 24 is coupled to the parallel combination of diode D2 and variable resistor R5, the combination connected in series with capacitor C11 and ground. Inverter 50 is coupled between the junction of R5 and C11, and the output 5 ($\overline{\phi_1}$) of the switch clock generator 30. Similarly, the $\phi_2$ output of network 24 is coupled to the parallel combination of diode D1 and variable resistor R4, the combination connected to ground through series capacitor C10. Inverter 51 is coupled between the junction of R4 and C10 and provides output 6 ($\phi_2$) of the generator 30.

From the illustrative example shown in the co-pending application incorporated by reference, the normalized capacitance values for the capacitors shown in FIG. 2 are, C1 = 3.54, C2 = 1, C3 = 8.76, C4 = 39, C5 = 1, C6 = 20 and C7 = 20. The amount of monolithic microelectronic chip area required to provide capacitances is in direct relation to the amount of capacitance required. For the above capacitors, a total of 93.3 units of capacitance is required in order to implement the selected transfer function. By setting C2 equal to a nominal value of 100 picofarads (pf), the remainder of the capacitors may be valued in accordance with the normalized unit value calculated for each capacitors. Thus, C1 = 354 pf, C2 = 100 pf, C3 = 876 pf, C4 = 3900 pf, C5 = 100 pf, C6 = 2000 pf and C7 = 2000 pf. FIG. 3 is a graph of a filter attenuation characteristic for the filter shown in FIG. 2 and having the foregoing calculated capacitance values.

A clock frequency of 74.5 KHZ is selected and appears at outputs 5 and 6 as $\phi_1$ and $\phi_2$, respectively, as the two-phase non-overlapping clock signals previously described. The field effect transistors shown in FIG. 2, i.e., FETS F1 through F10, are switched in accordance with the clock signals $\phi_1$ and $\phi_2$ that are coupled to the respective gates. The switching phenomena and corresponding charge and discharge cycles of the switched capacitors are described in detail in an article entitled, "Mos Switched Capacitor Filters" appearing in the proceedings of the IEEE, Volume 67, January, 1979, and thus will not be repeated here. The switching phenomena and corresponding charge and discharge cycles of the switch capacitors, however, will be discussed in conjunction with a capacitance ratio multiplication method to be discussed later.

The 93.3 units of capacitance may place constraint on filter realization due to the corresponding amount of microelectronic chip area required to provide such capacitance. Additionally, a normalized value of capacitance required to realize a desired transfer function may be smaller than practically obtainable in a chip when considering fabrication limitations, parasitic capacitances and the like.

Referring now to FIGS. 4A through 4C, there is shown capacitors arranged and switched to provide capacitor ratio multiplication. More specifically, capacitor $C_A$ may be considered the capacitor normally receiving charge in a circuit. Capacitor $C_B$ is alternately switched to share charge with capacitor $C_A$ so as to reduce the charge on $C_A$, with a resultant equivalent effect of a reduction in the apparent capacitance value of $C_A$. Said a little differently, the reduction of charge on capacitor $C_A$ makes $C_A$ appear like a smaller valued capacitor in the circuit and has a corresponding effect on the circuit transfer function.

FIG. 4A shows capacitor $C_A$ in the charge sampling mode. Capacitor $C_A$ is coupled between the "switch arms" of switches S1 and S2. In switch position 1, switch S1 couples one terminal of capacitor $C_A$ to ground and in switch position 2, couples $C_A$ to the remaining portion of the circuit (identified as II). Switch S2 couples the other terminal of capacitor $C_A$ to the lead portion of the circuit (switch position 1) that is identified as line I; to sharing capacitor $C_B$ (switch position 2); and to ground (switch position 3). Across sharing capacitor $C_B$, there is connected a discharging switch S3 that, in the closed position, causes capacitor $C_B$ to discharge to ground.

In a charge sampling mode, the "arms" of switches S1 and S2 are in position 1, a capacitor $C_A$ receives charge from line I. During the charge sample mode, switch S3 is closed to maintain capacitor $C_B$ in a discharged condition.

Subsequent to this charge sampling mode, the charge on capacitor $C_A$ is shared with the sharing capacitor $C_B$ (see FIG. 4B). Accordingly, in the charge share more, switch S3 is open and the "arm" of switch S2 is in position 2. Charge, therefore, will be shared by capacitors $C_A$ and $C_B$ in relation to their capacitance values.

Subsequent to the charge sharing mode, the charge remaining on capacitor $C_A$ is delivered (see FIG. 4C) to the portion of the circuit connected to line II. In the charge delivering mode, the "arm" of switch S1 is in position 2, and the arm of switch S2 is in position 3, and switch S3 is closed. Thus, capacitor $C_A$ coupled between line II and ground delivers its charge to line II, and capacitor $C_B$ containing the shared charge is discharged to ground through switch S3.

The value of capacitance for capacitor $C_A$ is reduced to a new equivalent value $C'_A$, whereby $$C_A' = \frac{C_A}{C_A + C_B} \times C_A$$

Thus, if $C_A$ has a normalized capacitance value of 1 and $C_B$ a normalized value of 9, $C'_A$ will be reduced by a ratio of 1/10 of $C_A$ or an equivalent 10 times reduction in the capacitance value of $C_A$. Several stages of sampling, sharing and delivering charge may be cascaded, i.e., capacitance ratio multiplication; thus, the overall capacitance ratio multiplication would be the product of the ratios formed in each ratioing operation. Thus, if two stages of charge sharing cascaded, an equivalent reduction by 100 would result, using the foregoing normalized capacitance values.

Alternatively, capacitors $C_A$ and $C_B$ may be made to share charge two or more times per charge delivery operation by using a more complex switching sequence. Thus, if the charge sharing is performed N times, the resulting equivalent capacitance reduction is given by:

$$\left( \frac{C_A}{C_A + C_B} \right)^N$$

Capacitor ratio multiplication may be performed throughout the circuit at the appropriate locations dictated by the desired filter/circuit transfer function. From the ratio numbers previously generated, it is recognized that because of the capacitance ratio multiplication technique, smaller equivalent capacitance values are attainable without reduction of areas typically necessary for such small values of capacitance. The capacitance value of small capacitors is limited in accuracy since the small areas required to provide small capacitances cannot be made and determined with great accuracy. Additionally, parasitic capacitances on monolithic chips, for example, may be in the range of values of capacitances required for circuits, thereby placing a lower limit on the value of capacitance accurately obtainable. Cascaded capacitance ratio multiplier arrangements overcome these shortcomings by providing a technique for forming equivalent smaller capacitances from larger, more accurately obtainable values.

Figure 5:
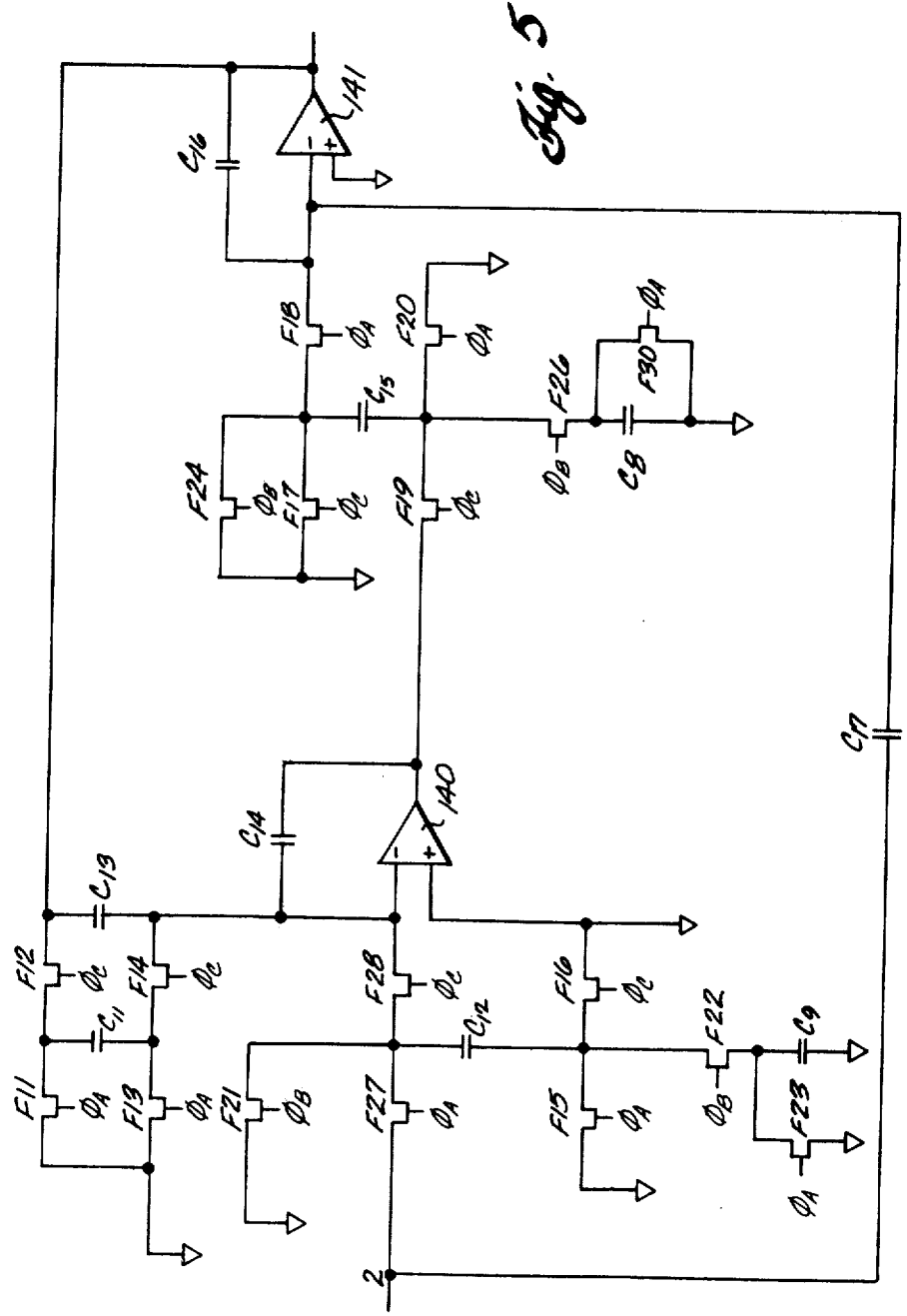
FIG. 5 is a schematic diagram of a controllable filter circuit modified to include capacitance ratio multiplication.

Referring now to FIG. 5, there is shown the controllable filter 10 of FIG. 2 with the addition, however, of sharing capacitors C8 and C9 for providing capacitance ratio multiplication. The controllable filter 10 is modified to provide the sampling, sharing and delivering of charge previously described in order to carry out the capacitance ratio multiplication. More specifically, FETS F21, F22, F23, F24, F26, F27, F28 and F30 have been added in order to alternatively switch sharing capacitors C8 and C9 in accordance with the method described herein. Capacitors C8 and C9 have been added for sharing charge with capacitors C12 (shown as C2 in FIG. 2) and C15 (shown as C5 in FIG. 2), respectively. Additionally, FETS F21, F27 and F28 have been added to switch one terminal of capacitor C12 between the input 2, ground and the non-inverting input of amplifier 140 (shown as amplifier 40 in FIG. 2). FETS F22 and F23 have been added for coupling capacitor C12 to capacitor C9 (for charge sharing) and for discharging C9, respectively.

FET F24 has been added to couple capacitor C15 to ground and FETS F26 and F30 have been added for coupling capacitor C15 to capacitor C8 (for charge sharing) and for discharging C8, respectively. No other additions have been made to the circuit of FIG. 2, and for comparison purposes, each element of FIG. 4 can be traced to an equivalent element in FIG. 2 by adding 10 to the element numbers of FIG. 2 (100 in the case of the amplifiers).

To provide the sampling, sharing and delivering charge modes, a three-phase clock signal generator is required. The switch clock signal generator 30 may be implemented by a conventional counter having three separate outputs. The outputs define three phase non-overlapping clock signals, namely, phase A ($\phi$A), phase B ($\phi$B) and phase C ($\phi$C) produced in a manner similar to that of the two-phase clock previously discussed. The clock signals are phased 120° in order to prevent signal overlapping. The gates of FETS F11, F13, F15, F18, F20, F23, F27 and F30 are controlled by $\phi$A, the gates of FETS F21, F22, F24 and F26 are controlled by $\phi$B and the gates of FETS F12, F14, F16, F17, F19 and F28 are controlled by $\phi$C. During the existence of a clock signal, the FET coupled to such clock is energized, i.e., rendered conductive.

The phase signals are sequenced such that the $\phi$C occurs first, $\phi$B second, and $\phi$A third, the sequence repeating at the predetermined clock frequencies. During $\phi$C, capacitor C15 is coupled to ground through FET F17 and coupled to the output of amplifier 140 through FET F19. Additionally, capacitor C12 is coupled through FET F28 to the inverting input of amplifier 140 and to ground through FET F16. Capacitor C11 is connected across capacitor C13 through FETS F12 and F14.

During $\phi$B, capacitors C12 and C9 are connected in parallel through FETS F21 and F22, C9 sharing the charge previously stored in C12. Similarly, capacitor C15 is connected in parallel with capacitor C8 through FETS F24 and F26, C8 sharing the charge previously stored in capacitor C15.

During $\phi$A, capacitor C15 is coupled to the inverting terminal of amplifier 141 through FET F18 and to ground through FET F20. Additionally, capacitor C8 is discharged to ground through FET F30, and capacitor C9 is discharged to ground through FET F23. Capacitor C11 is discharged to ground through FETS F11 and F13 and capacitor C12 is connected to the input 2 through FET F27 and ground through FET F15.

In accordance with the circuit of FIG. 5, the corresponding ratio reduction of the capacitances of capacitors C5 and C2 are formed from:

$$C2' = \frac{C2}{C2 + C9} \times C2$$

and $$C5' = \frac{C5}{C5 + C8} \times C5$$

The effect on the reduction of required chip area to implement the filter transfer function of the filter shown in FIG. 2 using, however, the capacitor ratio multiplication technique is readily shown by lettering capacitor C5=1, C8=4, C6=4, C2=1, C9=2 and C4=13 and calculating C1 to be 1.18, C3=2.92 and C7=4. The selection of the unit values for C5, C8, C6, C2, C9 and C4 is merely for design convenience, and therefore the capacitances are not restricted to such values. The total number of units of capacitance to implement the example transfer function equals 33.1 or a savings of 65% over the number of units of capacitance required to implement the transfer function equation without the capacitance ratio multiplication technique.

The foregoing example utilizes a notch filter example to illustrate the herein-described invention. The technique, however, is not limited to notch filters and is applicable to any predetermined filter transfer function such as low pass, high pass or an arbitrary function.

While the basic principle of this invention has been herein illustrated along with one embodiment, it will be appreciated by those skilled in the art that variations in the disclosed arrangement, both as to its details and as to the organization of such details, may be made without departing from the spirit and scope thereof. Accordingly, it is intended that the foregoing disclosure and the showings made in the drawings will be considered only as illustrative of the principles of the invention and not construed in a limiting sense.

What is claimed is:

1. A capacitor ratio multiplier circuit comprising:
   switched capacitor means;
   sharing capacitor means for sharing charge with the switched capacitor means;
   first switch means for enabling the switched capacitor means to receive charge, said first switch means capable of coupling the switched capacitor means to the sharing capacitor means for sharing charge therewith in accordance with their respective capacitances, said first switch means capable of enabling the switched capacitor means to deliver its remaining charge; and
   second switch means for discharging the sharing capacitor means.

2. A capacitor ratio multiplier circuit comprising:
   a plurality of switched capacitors;
   a plurality of sharing capacitors, each one of the sharing capacitors capable of sharing charge with a different one of the switched capacitors;
   first switch means for enabling the switched capacitors to receive charge, said first switch means coupling the sharing capacitors to a respective one of the switches capacitors for sharing charge therewith in accordance with their respective capacitances, said first switch means enabling the switched capacitors to deliver charge; and
   second switch means for discharging the sharing capacitors.

3. A capacitor ratio multiplier circuit having switched capacitors that are switched between first, second and third circuit connections comprising:
   a plurality of sharing capacitors, each one of the sharing capacitors being capable of sharing charge with a different one of the switched capacitors;
   first switch means for switching the switched capacitors into the first, second and third circuit connections for sampling, sharing and delivering charge respectively, said first switch means coupling, in the second circuit connection, the sharing capacitors to a respective one of the switched capacitors causing them to share charge in accordance with a ratio of their respective capacitances; and
   means for discharging the sharing capacitors.

4. The method of decreasing the equivalent capacitance of a switched capacitor comprising the steps of:
   switching a first switched capacitor to a circuit port for receiving charge normally received thereby;
   switching the first switched capacitor to share charge with a second capacitor, said charge shared in accordance with a ratio of their respective capacitances;
   switching the first switched capacitor to deliver the charge remaining therein to a circuit port normally receiving the delivered charge; and
   discharging to ground the second capacitor.

5. The method of claim 4 wherein the recited steps are repetitively performed in the order recited.

6. The method of decreasing the equivalent capacitance of a switched capacitor comprising the steps of:
charging in a first circuit connection a first switched capacitor during a predetermined time interval;
shunting in a second circuit connection the first switched capacitor by means of a second capacitor to share the charge of and thereby partially discharge said first switched capacitor;
discharging in a third circuit connection the first switched capacitor; and
discharging the second capacitor.

7. Circuitry for decreasing the effective capacitance of a main capacitor disposed between first and second nodes comprising:
a three-phase clock source generating first, second and third repetitive phases in the order recited;
means responsive to the first phase for charging the main capacitor to the voltage at the first node, the charge on the main capacitor being dependent upon the actual capacitance of the main capacitor;
an auxiliary capacitor;
means responsive to the second phase for transferring charge from the main capacitor to the auxiliary capacitor in proportion to their respective actual capacitances; and
means responsive to the third phase for applying the voltage across the main capacitor to the second node.

8. The circuitry of claim 7, in which the charging means comprises:
means for connecting the first node to a first side of the main capacitor;
means for connecting a second side of the main capacitor to ground;
means for isolating the second node; and
means for discharging the auxiliary capacitor.

9. The circuitry of claim 8, in which the transferring means comprises:
means for connecting a first side of the auxiliary capacitor to ground;
means for disconnecting the first node from the first side of the main capacitor and connecting a second side of the auxiliary capacitor to the first side of the main capacitor;
means for connecting the second side of the main capacitor to ground; and
means for isolating the second node.

10. The circuitry of claim 9, in which the delivery means comprises:
means for connecting the first side of the main capacitor to ground; and
means for connecting the second side of the main capacitor to the second node.

11. A method of reducing charge transfer by a switched capacitor comprising the steps of:
charging in a first circuit connection a first switched capacitor;
reducing the charge on the switched capacitor by partially discharging said switched capacitor in a second circuit connection; and
discharging the remaining charge on switched capacitor in the first circuit connection.

* * * * *